United States Patent Office 3,506,958
Patented Apr. 14, 1970

---

3,506,958
DEVICE FOR VERIFYING HYDRAULIC PRESSURE IN MOTOR VEHICLE BRAKE SYSTEM
Tsuneo Kawabe, Kariya-shi, Japan, assignor to Aishin Seiki Kabushiki Kaisha, Aichi-ken, Japan, a joint-stock company of Japan
Filed June 2, 1967, Ser. No. 643,174
Claims priority, application Japan, June 7, 1966, 41/36,717
Int. Cl. B60q 1/00
U.S. Cl. 340—52      8 Claims

ABSTRACT OF THE DISCLOSURE

An electrical control circuit containing a combination of relays is operated by the main switch of a motor vehicle at each instance of starting of the engine to operate the master cylinder of the brake system automatically, temporarily, and independently of the normal pedal operation through a booster device operated by the negative pressure in the engine intake manifold, and the state of the resulting hydraulic pressure generation is automatically detected and indicated.

---

This invention relates to pressurized oil (hydraulic) control systems and more particularly to hydraulic brake systems of motor vehicles.

More specifically, the invention relates to a new verification device in a motor vehicle brake system of hydraulic type which device operates automatically at the same time as the starting of the vehicle engine to indicate whether or not the hydraulic system is in operable condition to produce brake fluid pressure in the normal manner.

It is an object of the present invention to provide a verification device of the above stated character which includes an electrical circuit operated by the turning of the engine starting switch (known also as the main switch or ignition switch) for starting the engine, that is, switching on the electric power to the starter motor, to actuate automatically the master cylinder and to indicate whether or not the resulting brake fluid pressure is in normal operative state.

Another object of the invention is to provide a device of the above stated character in which, in the event of failure of the circuit part for indicating development of brake fluid pressure, this failure is indicated by another indicating device as a failure in the brake system, whereby a double safety feature is afforded.

A further object of the invention is to provide a device of the above stated character which can be readily installed in an existing hydraulic brake system by merely adding a booster device to the known master cylinder and changing a few parts, and which can be readily applied also to a hydraulic brake system in which a master cylinder provided in combination with a booster device operable by another fluid is used.

According to the present invention briefly summarized, there is provided, in a motor vehicle brake system of hydraulic type operated by a specific brake hydraulic pressure generated by a master cylinder in accordance with pedal operation, a verification device for verifying normal generation of the hydraulic pressure, which device comprises, in combination, booster means for temporarily operating the master cylinder independently of the pedal operation, electrical control means operated by each instance of vehicle engine starting to operate the booster means and thereby to operate the master cylinder, and indicating means for indicating whether or not the brake hydraulic pressure is thereby generated.

The verification device of the above described character can be adapted to a hydraulic brake system with a master cylinder combined with a booster device of vacuum power cylinder type by utilizing the vacuum power cylinder as the principal component of the booster means of the verification device and controllably operating it by means of a valve operated by the electrical control means.

The nature, principle, and details of the invention, as well as the utility thereof, will be more clearly apparent from the following detailed description with respect to preferred embodiments of the invention when read in conjunction with the accompanying drawing, in which like parts are designated by like reference numerals, and characters.

Figure 1:
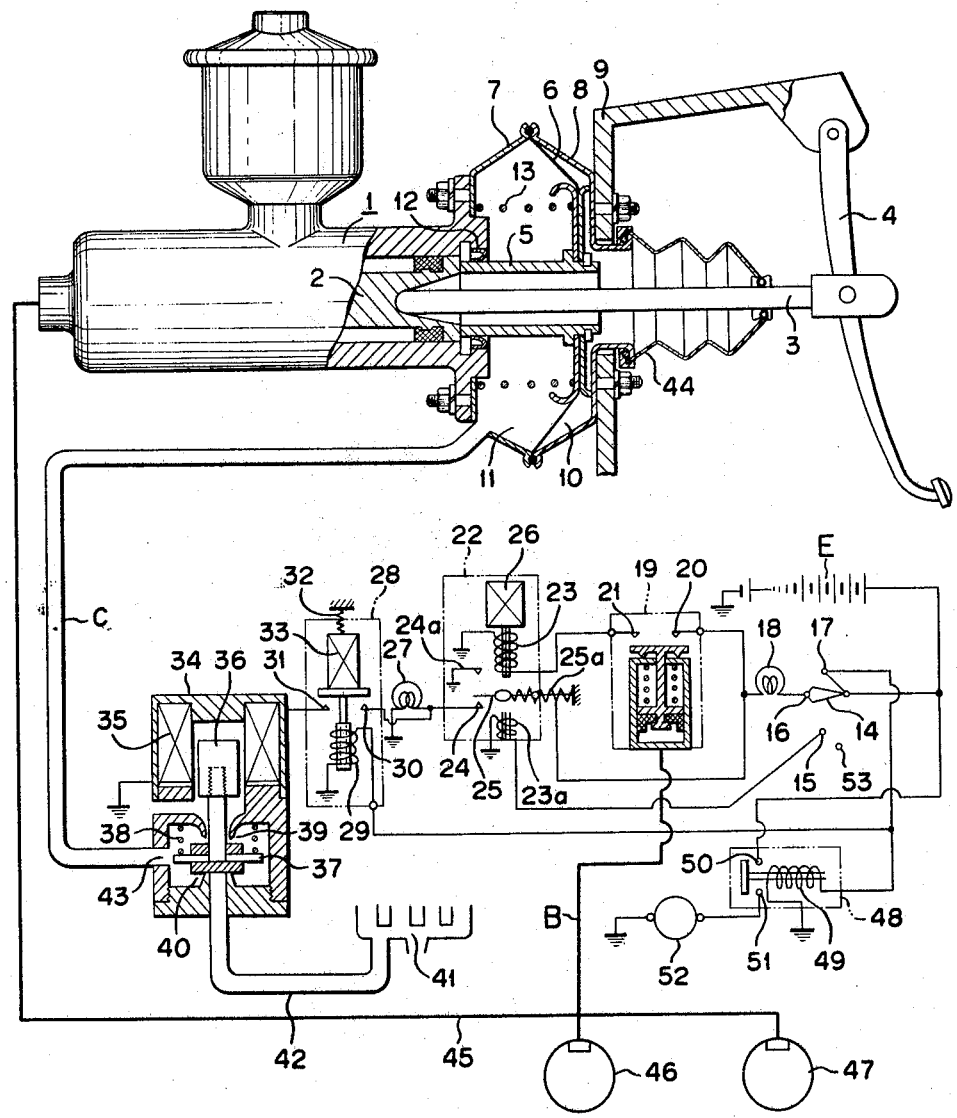
FIGURE 1 is a schematic diagram indicating the mechanical, hydraulic, pneumatic, and electrical organization of an example of an automotive brake system in which an embodiment of the invention is incorporated, the mechanical components of the hydraulic and pneumatic sub-systems being in longitudinal section.

Referring to FIGURE 1, the system shown therein illustrates one example of a motor vehicle brake system wherein a master cylinder without a booster power device depending on another fluid is used.

More specifically, the system is provided with a master cylinder 1 of known type having a hydraulic piston 2 which, upon being actuated by the depression of a brake pedal 4 which produces a pushing force transmitted through a pushrod 3 to the piston 2, produces brake fluid pressure. In this embodiment of the invention, this master cylinder 1 is mounted at its base head end on a shell 7 which, together with a shell 8 mounted on the dash board 9, forms a power cylinder which is coaxial with master cylinder 1 and has an interior divided by a diaphragm 6 into a high-pressure actuation chamber 10 and a low-pressure actuation chamber 11. The diaphragm 6 is fixed at its periphery to the junction between the shells 7 and 8 and at its center to an actuating tube 5 adapted to act on the piston 2 independently of the push rod 3.

An annular seal 12 is provided between the actuating tube 5 and the master cylinder end through which the actuating tube 5 enters the master cylinder 1. The diaphragm 6, together with the actuating tube 5, is urged toward the high-pressure side by a return spring 13. A vent hole 44 is provided to afford communication between the high-pressure chamber 10 and the outside atmosphere.

The master cylinder 1 of the above described organization is interconnected with a control circuit of the following composition and arrangement. An engine ignition or start switch having a moving contractor 14 is provided with an "OFF" contact 53, a contact 15 for excitation of a solenoid coil 23a, a contact 16 for causing a pilot lamp 18 and a warning lamp 27 to be lit by predetermined running conditions of the vehicle, and a starter contact 17 which can be contacted together with contact 16 to drive the engine starter.

The head of the master cylinder 1 at which brake fluid pressure is produced by the piston 2 is communicatively connected in the ordinary manner by a pipe line 45 to pairs of wheel brakes 46 and 47. A pipe line (B) is connected as a branch line from the pipe line 45 to a pressure switch 19, which operates when the brake fluid pressure produced in the master cylinder 1 reaches or exceeds a specified value to connect contacts 20 and 21 and thereby to close the circuit of a solenoid coil 23.

The solenoid coil 23 is a component of a switch 22 which closes the circuit of a contact 24 when a current is passed through the solenoid coil 23. Between the solenoid coil 23 and the aforementioned solenoid coil 23a in opposed relationship thereto, there is interposed a moving switch contactor 25, which is caused to undergo toggle action by a spring 25a. The switch contactor 25 is attracted toward and is placed in contact with a grounded contact 24a until a current passes through the solenoid coil 23a. The aforementioned warning lamp 27 indicates the closed state of the contact 24.

A switch 28 is actuated by a solenoid coil 29 to connect contact 30 and 31 when the aforementioned switch contactor 14 is closed in contact with contacts 16 and 17 to pass a current through the solenoid coil 29. When this current is cut off, a spring 32 and a time delay device 33 also constituting parts of the switch 28 operate to open the contacts 30 and 31 after a specified delay time.

The closing and opening of the contacts 30 and 31 in the switch 28 control the operation of an electromagnetic valve 34. A solenoid coil 35 is energized by the closure of contacts 30 and 31 to attract a core 36 connected to a valve 37 against the force of a return spring 38, whereby a passage 39 is closed and a passage 40 is opened. The passage 39 communicates with the atmosphere, while passage 40 communicates through a pipe line 42 with the intake manifold of the vehicle engine. Either the passage 39 or passage 40 is communicated by the operation of the valve 37 with a passage 43, which is communicatively connected by way of a pipe line C to the aforementioned low-pressure actuation chamber 11.

When the contactor 14 of the engine starting switch is in contact with contacts 16 and 17, a solenoid coil 49 of a switch 48 is also energized, whereby the core closes contacts 50 and 51 to operate the engine starter motor 52. The contact 50 and the moving contactor 14 of the starting switch are connected to one terminal of an electric power source (storage battery) E, the other terminal of which is grounded.

The system of the above described organization incorporating the verification device of the invention operates in the following manner.

When the engine starting switch is turned from its "OFF" position to the engine starting position, that is, as the moving contactor 14 is moved from the "OFF" contact 53 toward the position for contact with contacts 16 and 17, the contactor 14 first contacts contact 15 as a natural consequence, whereupon the circuit for energizing the solenoid coil 23a is simultaneously and instantaneously closed. Accordingly, the magnetic force of the solenoid coil 23a causes the contactor 25 to close the circuit of contact 24. Since this contactor 25 undergoes toggle action due to spring 25a as mentioned hereinbefore, it maintains its state of closure of the circuit of contact 24 even after the contactor 14 of the engine starting switch has separated away from contact 15 and has moved to contacts 16 and 17.

When the contactor 14 contacts contact 16, the lamps 18 and 27 are lit to indicate the normal state of the circuit. Then, when the contact 14 is turned further to contact contacts 16 and 17 simultaneously, the solenoid coil 49 of the switch 48 constituting a drive switch of the starter 52 is energized, and the contacts 50 and 51 are closed to drive the starter 52, which thereupon starts the engine (not shown). After this starting operation, the contactor 14 is again returned to its vehicle driving position in contact with contact 16.

When this contactor 14 of the engine starting switch contacts contact 17, the starter 52 is driven to start the engine, and, at the same time, the solenoid coil 29 for closing the contacts 30 and 31 is energized. Since the switch 28 is provided with the spring 32 and delay device 33 as described hereinbefore, the closed state of the contacts 30 and 31 is sustained for a preset time period after the contactor 14 separates away from contact 17.

The closed state of contacts 30 and 31 thus sustained after the engine starts causes the solenoid 35 of the electromagnetic valve 34 to remain in energized state whereby the core 36 is lifted (as viewed in FIGURE 1) to open passage 40 and close passage 39. Consequently, the negative pressure within the engine intake manifold 41 is transmitted through the negative pressure pipe lines 42 and C to the low-pressure actuation chamber 11. The diaphragm 6 is thereby caused by the difference between this negative pressure and atmospheric pressure to move toward the piston 2 of the master cylinder 1 and thereby to actuate the piston 2 through the actuating tube 5. Thus, the same action as that occurring when the brake pedal 4 is depressed is automatically accomplished.

Accordingly, brake fluid pressure is produced in the master cylinder 1 and is transmitted through the pipe line 45 to the wheel brakes 46 and 47. At the same time, this fluid pressure is transmitted through the branch pipe line B to the pressure switch 19, in which contacts 20 and 21 are thereby closed, whereby solenoid coil 23 is energized, and the contactor 25 which has been in contact with contact 24 under toggle action is attracted and moved into contact with the ground contact 24a.

As a result, the lamp 18 is lit, while the lamp 27 is extinguished, thereby indicating that the brake fluid pressure is being developed in the normal manner.

In the event that the brake fluid pressure is not being produced in a normal manner but is lower than that specified, the pressure switch 19 will not operate, and the circuit of contacts 20 and 21 will not close, whereby the lamp 27 will not be extinguished. Accordingly, a defect in the brake fluid pressure system can be detected simultaneously with the starting of the engine.

When the circuit of contact 24 is opened by the separation of contactor 25 therefrom, the flow of current to the electromagnetic valve 34 is cut off even when the contacts 30 and 31 are closed by the time delay device 33. Consequently, the passage 39 is open, and the negative pressure passage 40 is closed, whereby the low-pressure actuation chamber 11 is subjected to atmospheric pressure, and the difference in the pressures in chambers 11 and 10 becomes zero. Consequently, the diaphragm 6 is returned to its original position together with the actuating tube 5 by the elastic force of the spring 13, and the fluid pressure within the master cylinder 1 is dissipated.

As a result, since the contactor 14 of the engine starting switch is in its vehicle running state of contact with contact 16, all of the various circuits such as those of the pressure switch 19, the switch 28 with the delay device, and the electromagnetic valve 34 are returned to their respective positions prior to starting.

Figure 2:
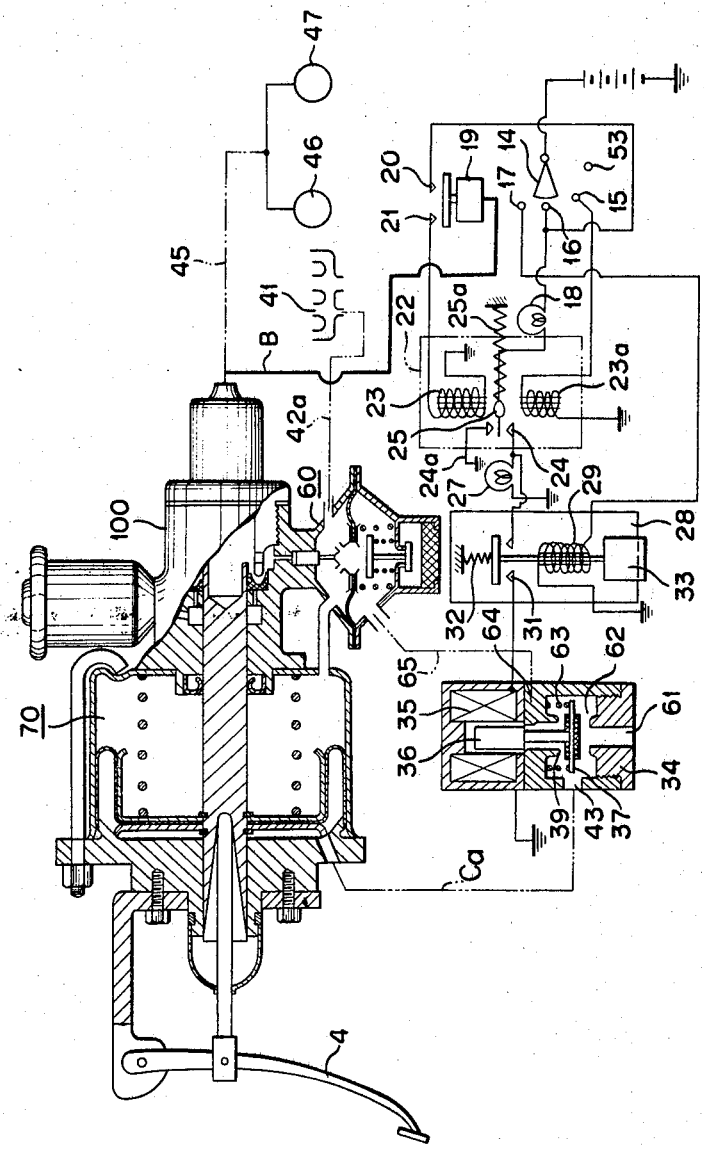
FIGURE 2 is a view similar to FIGURE 1 showing another embodiment of the invention as applied to a brake system having a master cylinder combined with a booster device of vacuum power cylinder type.

In a second embodiment of the invention as illustrated in FIGURE 2, the invention is applied to a vehicular brake system in which an ordinarily used master cylinder 100 with an integrally installed booster device is used. The electrical control circuit as described with respect to the first embodiment of the invention is intercoupled with the communicative system of a control valve 60 and a power cylinder 70 constituting principal components of the booster device, and the same verification as described hereinbefore is thereby accomplished.

The parts shown in FIGURE 2 which are the same as or are closely similar to corresponding parts in FIGURE 1 are designated by the same reference numerals and characters as in FIGURE 1. The arrangement illustrated in FIGURE 2 differs from that shown in FIGURE 1 in the communicative connection of the electromagnetic valve 34 to the power cylinder 70 by air pipe line Ca, of the engine intake manifold 41 to the control valve 60 by vacuum pipe line 42a, and of the control valve 60 to passage 64 of the electromagnetic valve 34 by vacuum pipe line 65.

The verification device of the invention as installed in a brake system in the manner illustrated in FIGURE 2 operates in the following manner. When the valve 37 of the electromagnetic valve 34 is raised, communication between air passage 61 open to the atmosphere and passage 43 is established, and the diaphragm of the power cylinder 70 is positively forced toward the master cylinder 100. At the same time, the negative pressure of the engine intake manifold 41 acting on the other side of the diaphragm causes the diaphragm to be forced with additional force toward the master cylinder, whereby brake fluid pressure is automatically produced.

In other words, in the first example of embodiment of the invention, a power cylinder with a diaphragm actuated by the negative pressure of the intake manifold is added to a master cylinder 1 which is originally not provided with a booster device to actuate automatically the master cylinder by the force due to the negative pressure, whereas in the second embodiment of the invention, the master cylinder 100 is originally provided with a booster device which is operated automatically in a positive manner by the pressure of another fluid and thereby has the advantage of even greater positiveness in automatically producing brake fluid pressure.

While, in each of the above described embodiments of the invention, the warning lamp 27 is connected to the side of contact 24 of the switch 22, it is also possible to connect this lamp 27 on the side of the grounded contact 24a thereby to cause the lamp 27 to be lit when the brake fluid pressure is being produced in the normal manner.

Furthermore, while a visual indicating means in the form of the lamp 27 is used in the above described examples, the invention is not limited to the use of only an indicating lamp, other indicating means such a blinking lamp, an audible indicating means, or a combination of a lamp and an audible means also being utilizable in the verification device of the invention.

While an air cylinder and diaphragm device of the vacuum power cylinder type is utilized in the aforedescribed first example to actuate the master cylinder, it will be apparent that other driving means, such as an electromagnet, may also be used instead and controllably operated by the control circuit.

Thus, as described above, the present invention provides a verification device whereby, by merely turning the engine starting switch or main switch, which must always be used at each instance of starting of a motor vehicle engine, and without depressing the brake pedal, the brake fluid pressure is automatically produced for a temporary verification period, and it is possible thereby to verify prior to driving that this brake fluid pressure is being produced in the normal manner. Accordingly, the present invention contributes greatly to safety in driving.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. In a motor vehicle brake system of hydraulic type operated by a specific brake hydraulic pressure generated by a master cylinder in accordance with pedal operation, a verification device for verifying normal generation of said brake hydraulic pressure comprising, in combination: booster means coupled to said master cylinder for temporarily operating the master cylinder independently of said pedal operation; electrical control means coupled to said booster means and to engine starting means and operated by each instance of starting of the vehicle engine to operate said booster means and thereby to operate the master cylinder; and indicating means connected to the brake system to indicate whether or not said brake hydraulic pressure is thereby generated.

2. The verification device as claimed in claim 1 in which said booster means comprises a vacuum power cylinder operable by the negative pressure in the engine intake manifold and an electromagnetic valve controlled by said electrical control means to control the application of said negative pressure to the vacuum power cylinder.

3. The verification device as claimed in claim 1 in which said indicating means comprises, in combination, a pressure-operated switch connected to a hydraulic part of the brake system and operating when said brake hydraulic pressure is attained to close electrical contacts and a signal lamp operated by the pressure-operated switch.

4. The verification device as claimed in claim 3 in which said electrical control means is an electrical circuit comprising: a main switch having a movable contactor connected to one terminal of an electrical power supply and first, second, third, and fourth fixed contacts; a first relay connected to said fourth fixed contact of the main switch to supply electric power to the engine starter motor; a second relay having an opening coil, a closing coil, one terminal connected by way of a pilot lamp to said third fixed contact of the main switch, and another terminal connected to one terminal of the signal lamp, said opening coil being connectable by the closure of the pressure-operated switch to the third fixed contact of the main switch by way of the pilot lamp, and said closing coil being connected to the second fixed contact of the main switch; and a third relay for switching power for operating the booster means, said third relay being operated by a coil connected to the fourth fixed contact of the main switch to close the circuit between the other side of the signal lamp and the booster means.

5. In a motor vehicle brake system of hydraulic type operated by a specific brake hydraulic pressure generated by a master cylinder in combination with a booster device of vacuum power cylinder type in accordance with pedal operation, a verification device for verifying normal generation of said brake hydraulic pressure comprising, in combination: an electromagnetic valve connected to said booster device, to the vehicle engine intake manifold, and to the atmosphere for temporarily operating the master cylinder independently of said pedal operation; electrical control means coupled to said electromagnetic valve and to engine starting means and operated by each instance of starting of the vehicle engine to operate the electromagnetic valve, thereby the booster device, and thereby the master cylinder; and indicating means connected to the brake system to indicate whether or not said brake hydraulic pressure is thereby generated.

6. The verification device as claimed in claim 5 in which said indicating means comprises, in combination, a pressure-operated switch connected to a hydraulic part of the brake system and operating when said brake hydraulic pressure is attained to close electrical contacts and a signal lamp operated by the pressure-operated switch.

7. The verification device as claimed in claim 6 in which said electrical control means is an electrical circuit comprising: a main switch having a movable contactor connected to one terminal of an electrical power supply and first, second, third, and fourth fixed contacts; a first relay connected to said fourth fixed contact of the main switch to supply electric power to the engine starter motor; a second relay having an opening coil, a closing coil, one terminal connected by way of a pilot lamp to said third fixed contact of the main switch, and another terminal connected to one terminal of the signal lamp, said opening coil being connectable by the closure of the pressure-operated switch to the third fixed contact of the main switch by way of the pilot lamp, and said closing coil being connected to the second fixed contact of the main switch; and a third relay for switching power for operating the booster means, said third relay being operated by a coil connected to the fourth fixed contact of the main switch to close the circuit between the other side of the signal lamp and the booster means.

8. The verification device as claimed in claim 1 in which said booster means in an electromagnetic actuator coupled to the piston rod of the master cylinder and controllably operated by said electrical control means.

References Cited

UNITED STATES PATENTS 3,106,430  10/1963  George _____ 303—1

JOHN W. CALDWELL, Primary Examiner

H. S. COHEN, Assistant Examnier

U.S. Cl. X.R.
303—1; 340—60